Dec. 6, 1966  P. M. LEMOIGNE  3,289,976
AIRCRAFT
Filed Oct. 28, 1964  7 Sheets-Sheet 1

Dec. 6, 1966     P. M. LEMOIGNE     3,289,976
AIRCRAFT
Filed Oct. 28, 1964     7 Sheets-Sheet 2

Dec. 6, 1966    P. M. LEMOIGNE    3,289,976
AIRCRAFT

Filed Oct. 28, 1964    7 Sheets-Sheet 4

United States Patent Office 3,289,976
Patented Dec. 6, 1966

1

3,289,976
AIRCRAFT
Pierre Marcel Lemoigne, 103 Ave. Verdier,
Montrouge, Seine, France
Filed Oct. 28, 1964, Ser. No. 407,092
Claims priority, application France, Oct. 29, 1963,
952,108; Mar. 6, 1964, 966,343; Oct. 12, 1964,
991,086
10 Claims. (Cl. 244—16)

This invention relates to an aircraft having a hollow aerofoil, of the glider type, said aircraft being characterized more particularly in that it is of an extremely light weight, low cost and small size as compared with the load that it can carry.

An aircraft according to the invention can be used both for piloted flight, in which case the load is formed by the pilot's weight, or for free or remote-controlled flight whereby loads released at a certain altitude can be recovered intact on the ground within a precise area after a gliding descent, control of the altitude and direction of the flight being possible on the aircraft by the pilot or from a distance.

The aerofoil of a glider according to the invention comprises an aerofoil of thin material which is kept extended by a frame at least some parts of which are deformable or articulated, the load it is required to transport being secured beneath said aerofoil.

Also, one or more of the deformable or articulated parts of the aerofoil of the aircraft can flap under the control of the pilot or driving means controlled by the pilot, or by a remote-control system, the flapping being intended to reduce the glide angle of the aircraft or make the same fly on a level course or even gain in altitude.

In one example of an aircraft according to the invention, the thin and preferably flexible aerofoil is formed by a plurality of panels, for example of fabric, which are interconnected and at least some of which have a free edge which, with the adjacent panel, forms nozzles through which the air passing from one surface of the aerofoil to the other is blown substantially tangentially to the aerofoil to produce a hyper-lifting effect, the said nozzles being so directed that the resultant thrust produced by all the nozzles is propulsive and directed rearwardly of the aircraft. According to one feature of the invention, the panels forming the aerofoil are so connected that the aerofoil, at least during flight, has a slightly convex form, the maximum hollow portion of the aerodynamic profile thus produced being equal to 20% maximum, and preferably being between 12 and 18% of the largest dimension of the aerofoil in plan view.

When the aerofoil is made from an assembly of panels of a thin and flexible material, such as fabric or plastics material in sheet form, the aerofoil assumes the said hollow aerodynamic profile only under the influence of the air pressure and the nozzles open only when the aircraft receives a movement in relation to the ambient air. On the other hand, if the aerofoil is made of a thin and relatively rigid material, such as metal sheet or rigid or semi-rigid plastics sheet, the said hollow profile and the form of the nozzles may be maintained even when the aircraft is inoperative.

According to one embodiment of the invention, the aerofoil has a low aspect ratio, for example, of about one, and in plan view may have a substantially circular shape or a shape such that it can be inscribed in a circle.

The frame which keeps the aerofoil extended may include at least some deformable parts so that the corresponding parts of the aerofoil can be flapped. This frame may be semi-rigid and be formed by an air-inflated peripheral tube or by an assembly of sections of relatively flexible metal rods of the piano-wire type, the said tubular

2 sections being detachably connected at certain points and to the periphery of the aerofoil so that the latter can be dismantled and folded.

According to another embodiment, the aerofoil may include a main surface which is kept extended by a substantially non-deformable main frame and one or more additional surfaces intended for flapping, the said surface or surfaces being kept extended by additional frames articulated on the main frame.

The load which it is required to lift (pilot, cabin or equipment) is suspended beneath the aerofoil by a plurality of connecting elements, such as stays, secured to the said aerofoil and/or its frame. If the glider according to the invention has to take off from ground or a sheet of water, at least some of the said connecting elements are rigid or may be temporarily rendered rigid so that the appropriate distance between the aerofoil and the load can be maintained even if the aerodynamic lifting thrust has not yet been attained.

In an aircraft according to the invention, at least some of the nozzles may be provided with a device whereby the air passage section in the nozzles can be varied, such section variation being controlled by the pilot (for example by means of a cable secured at a point of the free edge of the nozzle) so that the hyper-lifting or propulsive effect of the said nozzles can be varied, thus controlling the course of the aircraft as regards height, direction and speed.

The invention will be more readily understood from the following detailed description and the accompanying drawings which illustrate various embodiments of the invention by way of non-limitative examples.

Figure 1:
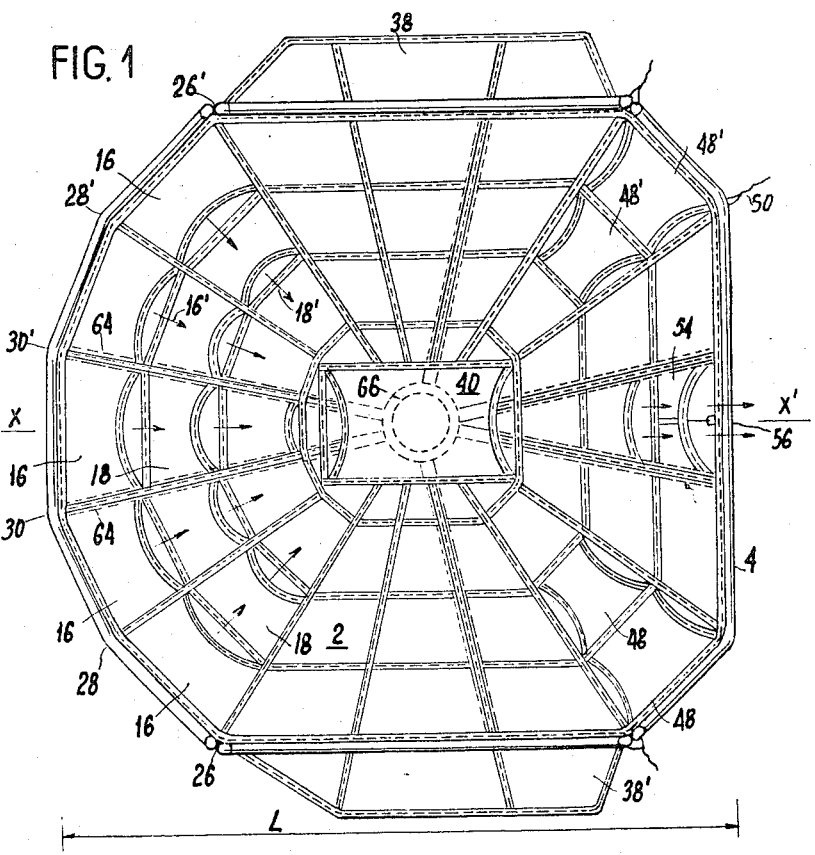
FIGURE 1 is a plan view of the aerofoil of an aircraft according to the invention.
Figure 2:
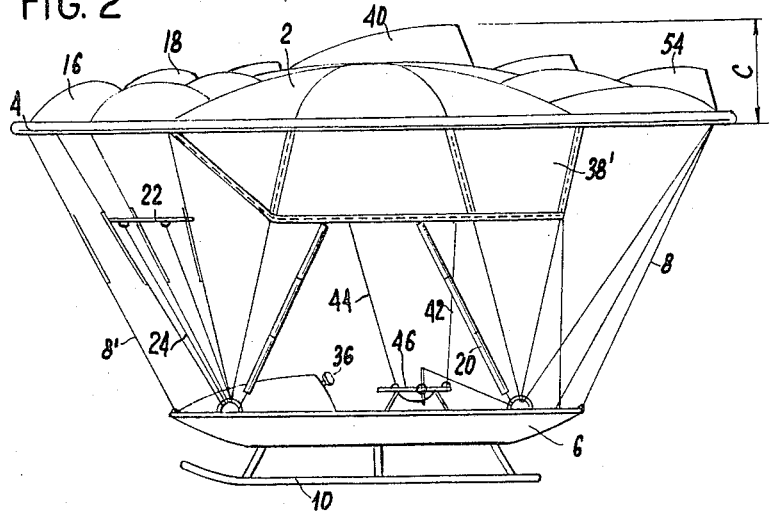
FIGURE 2 is a side view of the same aircraft.
Figure 3:
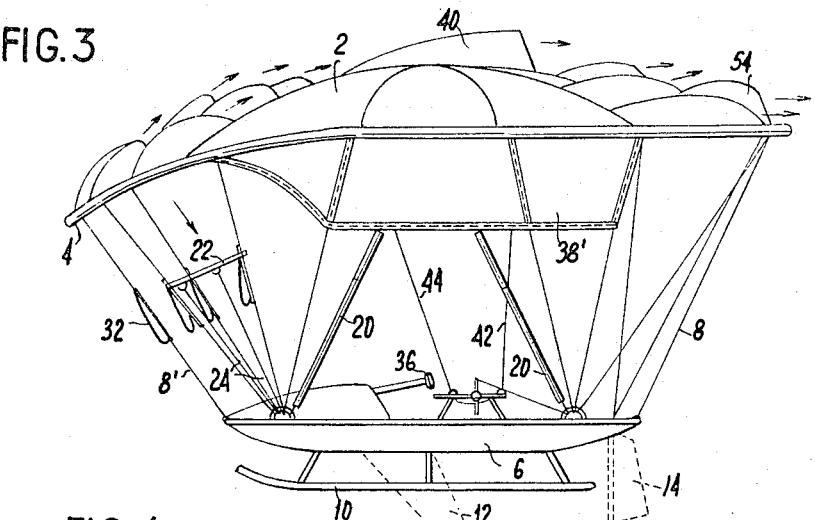
FIGURE 3 is the same view as FIGURE 2 but shows the deformation of the aerofoil during the flapping movements.

The machine shown in FIGS. 1 to 3 comprises an aerofoil 2 of a plastics fabric, a plasticised fabric or a similar thin and flexible material which is kept extended by a flexible peripheral frame 4 formed by an air-inflated tube. The load which is to be transported, for example a cabin 6 in which the pilot can sit, is suspended from the aerofoil by means of suspension ropes or stays 8.

A fabric having a low porosity or a plastics material in a thin sheet of sufficient strength is preferably used to make the aerofoil.

In some simple embodiments, the cabin may be replaced by a harness similar to that used for parachutes, the stays 8 being secured thereto.

Figure 8:
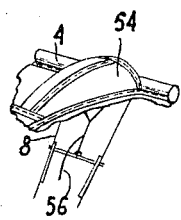
FIGURES 8 and 9 are perspective views showing one of the hyper-lifting nozzles in the open and closed positions.
Figure 9:
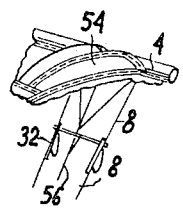
Figure 10:
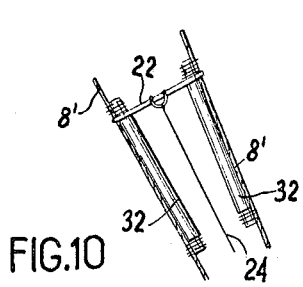
FIGURES 10 and 11 show the rope and stay system controlling the flapping of the aerofoil.
Figure 11:
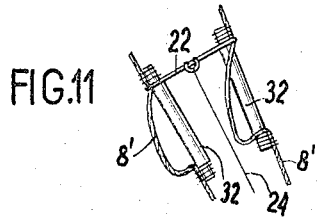

The aerofoil 2 is formed from substantially trapezoidal interconnected panels (some of which have a longer free edge than the free edge of the adjacent panel, and it assumes a rounded shape under the air pressure (see FIG. 8) to form a nozzle which blows air from beneath the aerofoil to the top thereof and substantially tangentially to the aerofoil.

Some of these nozzles 16–18 are grouped at the front of the aerofoil over one or two rows of panels symmetrically with respect to the longitudinal axis XX' of the aerofoil. The air blown at high speed by each of these nozzles (see arrows 16'–18') provides a hyper-lifting and propulsive component directed rearwardly along the axis XX'.

The aerofoil preferably containers other nozzles (lateral, rear and intermediate nozzles) of adjustable section or orientation to control the maneuvering of the aircraft, and they will be described in greater detail hereinafter.

According to one feature of the invention, the fabric panels are so cut and connected that the positive and negative air pressures on the two surfaces of the aerofoil in flight cause the aerofoil to assume the shape of a curved aerodynamic profile, of which the hollow portion C is relatively small, for example 15%, as compared with the largest dimension L of the aerofoil in plan view.

Figure 16:
FIGURE 16 is a partial view of a rigid stay or post used as a connecting element between the aerofoil and the load.

Some of the flexible stays or ropes 8 are preferably threaded inside rigid tubes 20 (FIGS. 2, 3 and 16) which fit together to form rigid masts or pylons which hold the aerofoil above the cabin (or above the pilot if the cabin is replaced by a harness) before take-off and after landing when the aerodynamic thrust on the aerofoil is inadequate.

When the machine is not being useds, these tubes 20 can be disconnected (like tent poles) so that the aerofoil can be folded after the peripheral tube 4 has been deflated.

Three or four of these rigid masts or pylons are preferably provided to form an indeformable triangular cabane to support the aerofoil, the top end of these poles being secured to the central and appropriately reinforced part of the aerofoil.

A flying machine of the above-described kind can be towed on land or water (or can slide on a snow-covered slope) until its take-off speed is reached and then be released at a certain height to glide down. With an aerofoil whose dimension L is about 4 to 5 metres, the gliding speed may be about 30 kilometres per hour with an 80 kg. pilot.

According to one embodiment of the invention, some of the suspension ropes 8' connecting the front of the aerofoil to the cabin 6 are so arranged that the pilot can deform the corresponding part of the aerofoil to produce periodic oscillations to accelerate the air flow through the nozzles 16–18 and increase their lifting effect to reduce the speed of descent of the machine and even enable the machine to fly without any loss of altitude.

A crossbar 22 (FIGS. 2, 3, 10 and 11) is secured to two or three adjacent suspension elements 8', one end of a rope 24 being secured to the crossbar 22 while its other end is within the reach of the pilot so that the latter by pulling thereon with his hands or feet can shorten or release the suspension ropes 8', i.e., downwardly deform the corresponding part of the aerofoil (as shown in FIG. 3) and produce sustaining oscillations.

Preferably, a rope 24 controls a first group of suspension ropes secured to the corners 26–28–30 of the aerofoil (FIG. 1) and a second rope 24' controls another group of suspension ropes secured to the corners 26'–28'–30', so that the pilot by simultaneously and periodically pulling on the two ropes can flap all the front part of the aerofoil or alternatively, by pulling on just one of the ropes 24, can subject the aerofoil to disymmetrical deformation so as to turn or straighten the aircraft.

Figure 12:
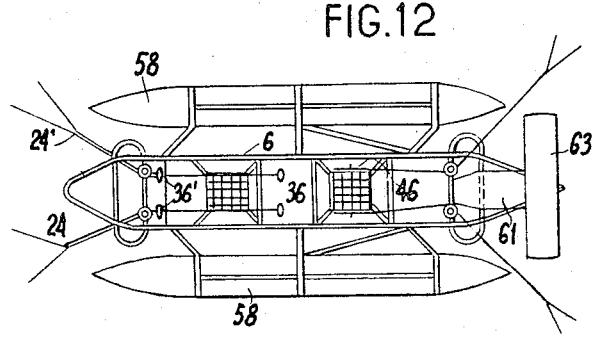
FIGURE 12 is a plan view of one embodiment of a cabin for an aircraft according to the invention.
Figure 14:
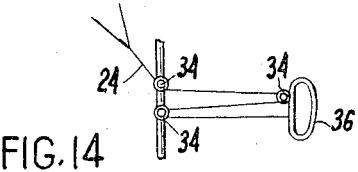
FIGURE 14 shows a device for controlling the flapping of the aerofoil.

Each rope 24 is preferably taken to within reach of the pilot through the agency of pulleys 34 and a handle 36 which acts as a control means (FIG. 14) so that the pilot can flap the aerofoil without any excessive force by pulling on the handles 36–36' (FIG. 12).

To ensure stability of the aircraft the aerofoil preferably comprises lateral fabric panels 38–38' which act as keels and which are held by the lateral suspension ropes.

Figure 4:
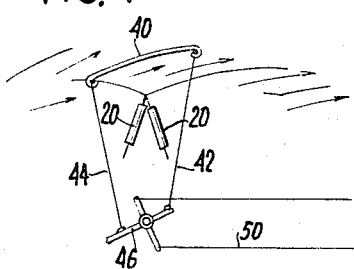
FIGURES 4 and 5 are a vertical section showing the two end positions of a deflector flap at the top of the aerofoil.

At the top of the aerofoil a central controlled fabric panel 40 may be provided, of substantially rectangular shape; this panel is sewn to the aerofoil only at its two edges parallel to the axis XX' of the aerofoil. This panel covers a free space at the centre of the aerofoil and one or other of its front or rear transverse edges may be selectively applied at the pilot's wish against the aerofoil, the opposite edge then being free and forming the exhaust of a nozzle (FIGS. 2 to 4). Under normal flight conditions the front edge of this panel is applied against the aerofoil and the nozzle formed by this panel blows air rearwardly (position shown in FIGS. 2, 3 and 4). The hyper-lifting and propulsive effect of this nozzle is simply added to the effect of the above-described front nozzles 16–18.

Figure 5:
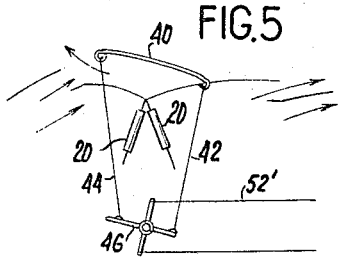

When it is required to reduce the hyper-lifting and propulsive effect of the nozzles, for example to "pancake" the aircraft on landing, by reducing its horizontal speed and increasing its speed of descent, the direction of the nozzle formed by the panel 40 is reversed (by means to be described hereinafter), i.e., its rear transverse edge is closed and its forward transverse edge is opened (position shown in FIG. 5), so that the nozzle blows in the forward direction and the aircraft is braked at the same time as its lift is reduced.

To control the panel 40, control ropes 42–44 are secured to its transverse edges, their other ends being connected to a pivotable lever 46 which can be actuated by the pilot's foot or hand.

Figure 6:
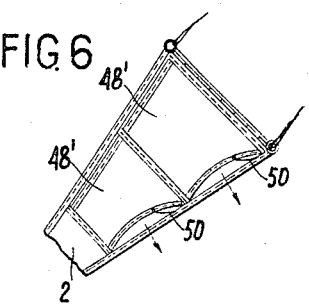
FIGURES 6 and 7 are views along a substantially horizontal plane of the end positions occupied by the lateral steering nozzles.

Other panels 48–48', which act as nozzles whose blowing direction can be reversed as in the case of the panel 40, can be disposed laterally, symmetrically on either side of the axis XX' of the aerofoil (FIG. 1). Under normal flight conditions these nozzles are open in the rearward direction (FIG. 6) and their hyper-lifting and propulsive effect is added to that of the nozzles 16–18–40.

Figure 7:
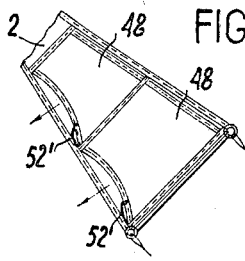

If, on the other hand, the rear edge is closed and the forward edge of the two groups of nozzles 48–48' is opened (see FIG. 7) the braking and lift-reduction effect required for landing is obtained.

If one of the groups of lateral nozzles (for example 48') blows in the rearward direction while the other blows in the forward direction (for example 48, see FIGS. 6 and 7), a disymmetric propulsive effect is obtained so that the aircraft can be turned, for example to the left in the example illustrated.

As in the case of the central panel, the nozzles 48–48' are respectively controlled by ropes 50–50' and 52–52' which lead to levers 46 controlling the panel 40.

With this arrangement, if the pilot operates the two levers 46 in one direction or the other, normal flight or braking conditions are obtained, while if the levers are operated in the reverse direction the aircraft is made to turn.

The aerofoil may also comprise a rear nozzle or group of rear nozzles 54 (FIGS. 1, 2, 3, 8 and 9) preferably of controllable section and whose closure can be controlled by a rope 56.

Figure 13:
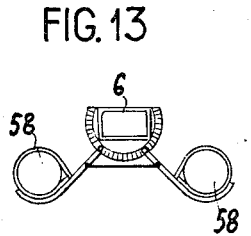
FIGURE 13 is a vertical section of the same cabin.

FIGS. 12 and 13 show a cabin 6 mounted on two floats 58 after the style of a catamaran.

Figure 15:
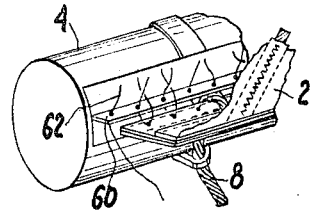
FIGURE 15 is a partial perspective view of the semi-rigid frame and the way in which it is connected to the aerofoil.
Figure 17:
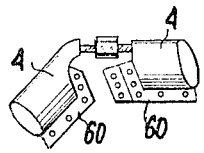
FIGURE 17 is a part view of the installation of the inflatable tube.

The inflatable tube 4 may be made in one or more connected parts (FIG. 17) and the aerofoil may be secured to the tube (FIG. 15) through the agency of a perforate strip 60 stuck to the tube and laced by means of a rope 62 to the edge of the peripheral panels of the aerofoil which are provided with a row of eyelets.

An aircraft according to the invention can be used for both sport and utilitarian purposes. Although the invention relates more particularly to a glider which can be towed and then released at altitude, or which can take off along a snow-covered slope or on a sheet of water and which can then retain its altitude or even fly higher under the effect of flapping the aerofoil by the pilot's own physical force, the invention also relates to an aircraft provided with a low-power engine 61 actuating a screw 63 (FIG. 12) for example of the type described in French Patent No. 951,186 by the same inventor, which engine in a variant can control the flapping of the aerofoil.

As a result of the hyper-lifting properties of the aerofoils of the above-described type, it is possible to produce what might be termed flying platforms which can lift a very substantial load in comparison with their unladen weight and take-off or land over short distances.

Figure 18:
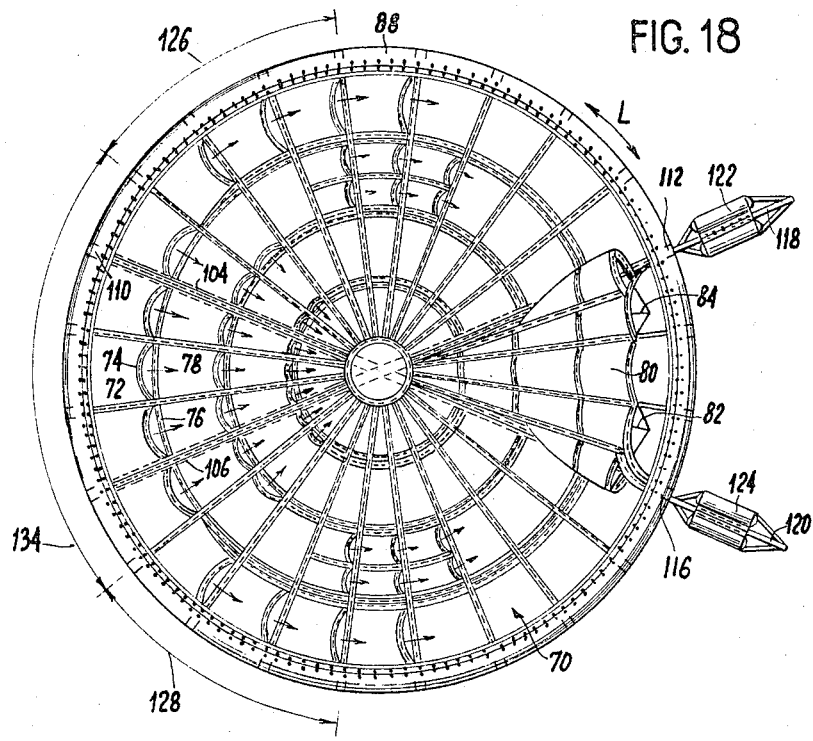
FIGURE 18 is a plan view of one embodiment of an aerofoil for an aircraft according to the invention.
Figure 19:
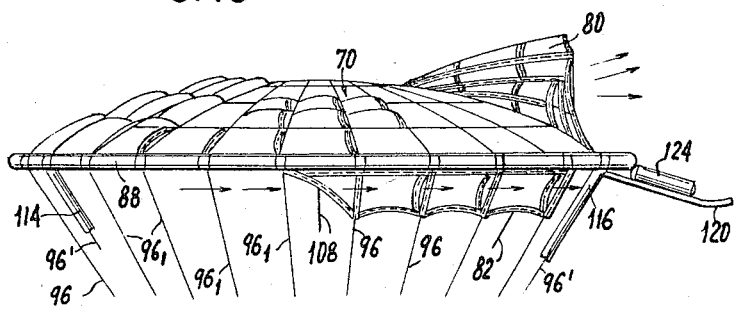
FIGURE 19 is an elevation of the same aerofoil.

In the embodiment shown in FIGS. 18 and 19, the aerofoil is circular in plan view (and hence of an aspect ratio of 1) and is formed by panels of fabric or plastics material, such panels being substantially trapezoidal and interconnected, some of the said panels, e.g., 72, having a free edge 74 longer than the free edge 76 of the adjacent panel 78. As was described hereinbefore, these panels, e.g., 72, assume a rounded shape under the air pressure (see FIG. 19) to form nozzles which blow air from beneath the aerofoil to the top thereof and substantially tangentially to the aerofoil surface. These nozzles are distributed in three groups (front, right-hand side and left-hand side group) which produce a general hyper-lifting and propulsive component extending rearwardly of the aerofoil.

Figure 24:
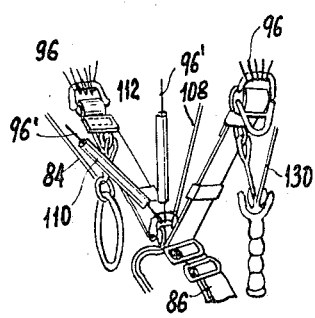
FIGURE 24 is a partial view in perspective of the harness connecting the pilot to the aerofoil poles and suspension elements.
Figure 25:
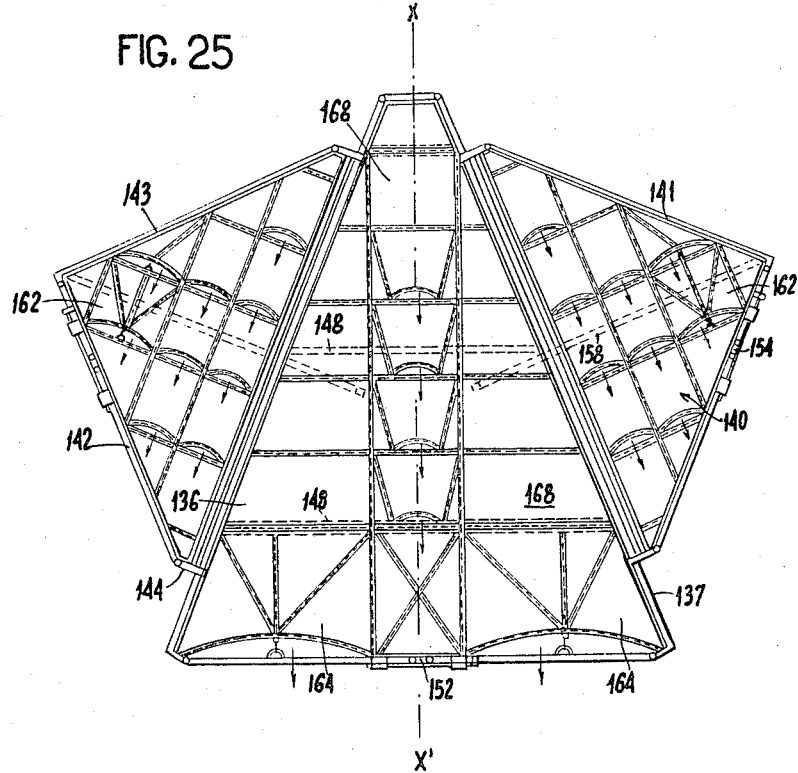
FIGURES 25 to 27 are three perpendicular views of another aircraft according to the invention.
Figure 26:
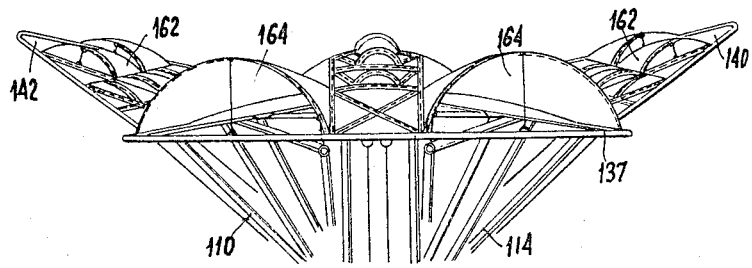
Figure 27:
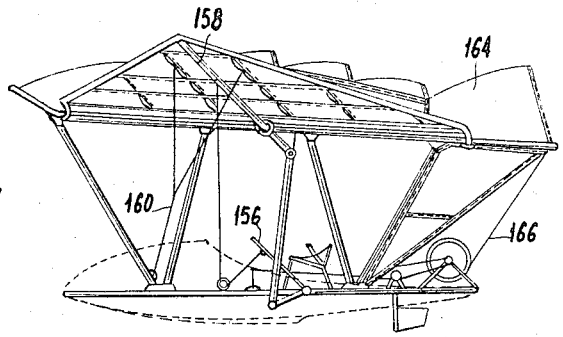
Figure 28:
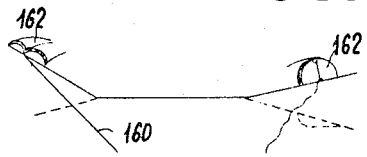
FIGURES 28 and 29 are two views of the rear of the aerofoil of the same aircraft.
Figure 29:
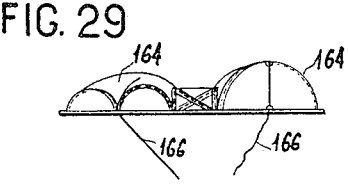

The rear part of the aerofoil may be provided with a large-section nozzle 80 which blows air directly in the rearward direction and whose air-passage section can be changed in flight by the pilot (symmetrically or disymmetrically) by means of control ropes 82–84 which return to the harness 86 (FIG. 24) supporting the pilot.

Figure 20:
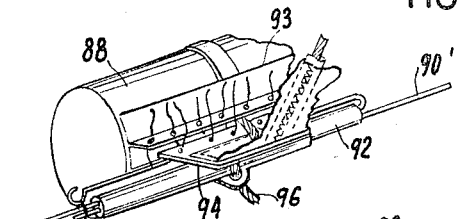
FIGURES 20 and 21 are partial views in perspective, of the metal wire frame which holds the aerofoil extended.
Figure 21:
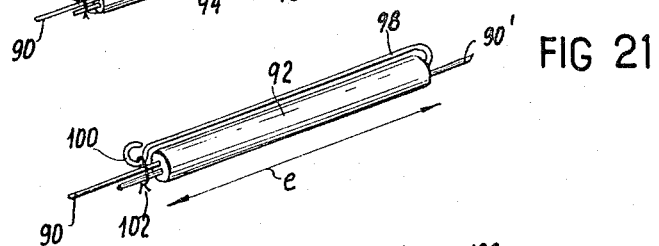

The aerofoil is kept extended and relatively flat by a peripheral frame formed by an inflatable tube 88 and/or by sections of metal wire of the piano wire type 90, 90', etc., which are detachably connected in pairs and which are strung in pairs in semi-rigid tubes 92, such tubes being made for example of rubber or a plastics material (FIGS. 20 and 21).

The frame cam thus be readily and rapidly assembled and dismantled. When the piano-wire frame is provided over the entire periphery of the aerofoil, a complete circle is obtained of sufficient rigidity to keep the aerofoil extended to the required diameter but sufficiently flexible to enable some of the marginal parts of the aerofoil to be deformed or flap.

Such a frame system has the advantage that it does not undergo abrupt deformation beyond a certain force (for example in the event of a squall) as the rubber tube alone would do.

In addition to the above-described peripheral frame, transverse or diametric stiffeners, e.g. two air-inflated tubes or slats 104 and 106 shown in FIG. 18 may be added to keep the aerofoil extended and retain its slightly hollow shape. A central suspension member 108 also contributes to maintaining a relatively flat profile for the aerofoil.

In the embodiment shown in FIGS. 18 and 19, four posts or tubes are provided—110–112–114–116—which are strung on ropes 96' and which enable the pilot to keep the aerofoil in an appropriate position and straighten the same on take-off when the aerofoil is not yet exerting a lift.

Two tillers or floats 118–120 may be disposed on the rear part of the aerofoil. They are preferably rigidly connected to the top tubular sections of the rear posts 112–116 and rest on the ground or water on take-off, the aerofoil then being kept at an incidence of about 45°.

In the embodiment shown in FIGS. 18 and 19, the hyper-lifting and propulsive flapping is preferably transmitted to the aerofoil zones 126–128 situated laterally and at the front of the transverse diameter of the aerofoil, the four suspension elements $96_1$ in these zones of the aerofoil being led to a control rope 130 actuated by the pilot to flap the aerofoil or, alternatively, produce disymmetrical deformations thereof for turning purposes.

Figure 22:
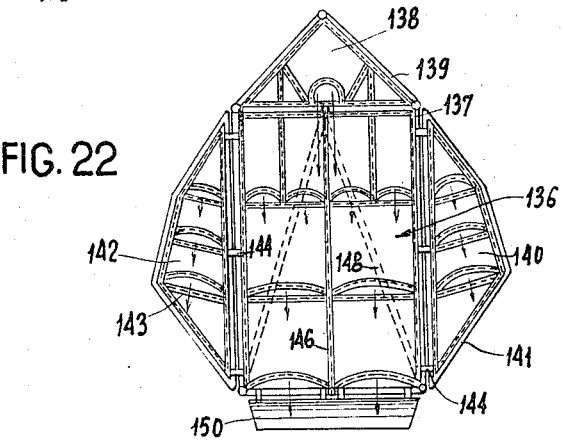
FIGURES 22 and 23 are plan and front views of another embodiment of the aerofoil.
Figure 23:
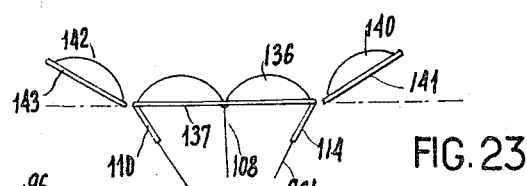

In the embodiment of the invention shown in FIGS. 22 and 23, the aircraft aerofoil comprises a substantially rectangular central part 136 provided with a peripheral frame 137 which can be continued by a pointed part 138 also extended by a frame 139. Two lateral lift surfaces or ailerons 140–142 are mounted on the longitudinal edges of the frame 137 and are respectively kept extended by peripheral frames 141–143 which are articulated, for example by fastening means 144, on the frame 137 to permit pivotal movement of the ailerons.

In this embodiment, therefore, the frame 137 may be rigid but preferably demountable and it is made, for example, from metal sections or tubing, two stiffening elements 148 completing the frame structure and enabling it to be folded into a small size.

Of course, the main part of the aerofoil and the ailerons are formed from fabric panels at least some of which form substantially rearwardly directed nozzles. Some of these nozzles, more particularly the nozzles situated on the front triangle 138, may have a divergent/convergent section to operate after the style of a Venturi and blow the air at high speed to the back of the aerofoil.

The aerofoil assembly is supported above the cockpit by posts, e.g., 110–114, and one or more central suspension elements 108 hold the axial zone 146 of the main part of the aerofoil with respect to the cockpit.

An aircraft of the kind whose aerofoil is shown in FIGS. 22 and 23 may comprise an additional surface 150, preferably of controllable incidence, to act as an elevator and it may be made of a lightweight material so as to form a float as well. The rear edge of this surface 150 can bear on the ground or float on the water on take-off so that the aerofoil can assume a considerable incidence before flight.

The above-described aircraft is intended more particularly to be towed and then released at altitude, its rate of descent then being reduced by periodic flapping. It may also be provided with an engine or any propulsion unit (for example a rocket) and/or remote-control means so that loads can be dropped at specific places.

FIGS. 25 to 31 illustrate an aircraft with hollow aerofoils and a hyper-lifting and propulsive effect, this aircraft being a variant of that shown in FIGS. 22 and 23. The main aerofoil 136 is of substantially triangular shape and is completed by lateral surfaces 140–142, whose frames 141–143 are articulated at 144 on the frame 137 on the main aerofoil to enable the said lateral surfaces to flap.

Figure 31:
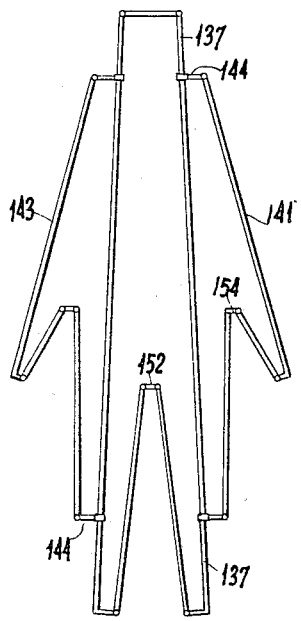
FIGURE 31 shows in a partly folded position, the frame which supports the aerofoil of the same aircraft.
Figure 30:
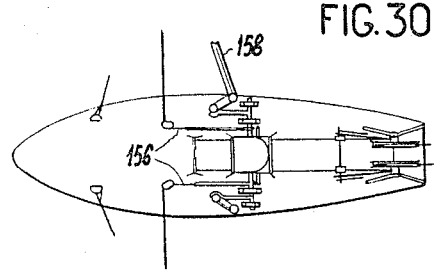
FIGURE 30 is a plan view showing the arrangement of controls in the cabin or nacelle.

The frames 137–141–143, which are formed, for example, by light-alloy sections or tubing, may include joints 152–154 so that the aerofoil can be folded to a small size (FIG. 31).

The flapping can be transmitted to the side surfaces by the pilot through the agency of just one or two levers 156 connected to longitudinal members 158. Ropes 160 enable the cyclic or selective closure of the nozzles 162 of the side surfaces (FIG. 28) to be controlled, for example to turn the aircraft or reduce its lift; and similarly the rear nozzles 164 can be opened by ropes 166.

According to a preferred embodiment of the invention, the fabric panels 168 forming the main aerofoil are so cut and connected that the maximum hollow portion of the aerofoil is about 10 to 15% of the largest plan-view dimension of the aerofoil.

For light aircraft with which it is required to fold the aerofoil, use will be made of fabric or sheets of thin and flexible plastics material for the aerofoil or at least some parts thereof, but in the case of heavy-weight aircraft it is of course possible to use thin metal sheet or rigid or semi-rigid plastics sheet assemblies or else a thin sheet could be moulded or deep-drawn to give it the required hollow profile and form the accelerator nozzles therein.

The aerofoil of an aircraft according to the invention has a relatively high fineness despite its low aspect ratio, because of the reduction of marginal turbulence which is drawn in by the lateral nozzles. Such aircraft have no loss of speed because if the lift produced by the speed of translation becomes inadequate, the aircraft drops like a parachute. It can then land without damage if it is at a low altitude or, if it is at a sufficient altitude, can resume its gliding flight after a minimum loss of altitude after the style of a parachute.

The invention is naturally not limited to the embodiments described and illustrated; it can be modified in various ways familiar to those versed in the art depending upon the required application and without thereby departing from the scope of the invention.

I claim:

1. An aircraft comprising a sustaining element having relatively fixed and movable concavo-convex surface sections, a plurality of air nozzle means in said sustaining element for directing the air from the concave lower surface to the convex upper surface in a direction substantially tangentially of the convex surface for producing a reacting propulsion component as well as a lift increasing suction effect at said convex surface of the sustaining element, and means for deflecting the movable surface section relative to the fixed surface section in a downward direction for producing an additional propulsion effect by accelerating the entry of air into the nozzle means of the movable surface section during the downward deflecting movement thereof.

2. The aircraft as claimed in claim 1 including frame means operably related to the periphery of the sustaining element for maintaining the normal outline of the sustaining element when said sustaining element is inflated by the air under the concave lower surface thereof.

3. The aircraft as claimed in claim 2 in which said frame means is defined by an elastically deformable ring.

4. The aircraft as claimed in claim 1 including a rigid main frame operably related to the periphery of the sustaining element for maintaining the normal outline of the sustaining element when said sustaining element is inflated by the air under the lower concave surface thereof.

5. The aircraft as claimed in claim 1 in which the aspect ratio of the sustaining element is in the region of one.

6. The aircraft as claimed in claim 1 including at least one control rope having opposite ends, and means operably relating one end of the control rope to the movable surface section so that upon pulling the opposite end of the rope periodic downward deflections can be imparted to the movable surface section.

7. The aircraft as claimed in claim 1 in which the air nozzle means includes devices for controlling the air passage section in the air nozzle means.

8. The aircraft as claimed in claim 1 including a load to be supported and flexible stays operably connected to the sustaining element and load for suspending the load below the sustaining element.

9. The aircraft as claimed in claim 8 including at least one rigid pole interposed between the sustaining element and the load.

10. The aircraft as claimed in claim 1 in which at least some of the air nozzle means include control means for controlling the direction of movement of the air through such air nozzle means.

References Cited by the Examiner

UNITED STATES PATENTS

| 1,104,242 | 7/1914 | Bonnot et al. | 244—35 |
| 1,312,686 | 8/1919 | Dorr | 244—13 |
| 1,401,934 | 12/1921 | Zahm | 244—13 |
| 1,880,207 | 10/1932 | Lougheed | 244—41 |

FOREIGN PATENTS

| 636,843 | 1/1928 | France. |
| 42,968 | 8/1917 | Sweden. |

MILTON BUCHLER, *Primary Examiner.*

L. C. HALL, A. E. CORRIGAN, *Assistant Examiners.*